(12) United States Patent
Dhuler

(10) Patent No.: US 10,529,210 B2
(45) Date of Patent: Jan. 7, 2020

(54) PERSONAL SAFETY DEVICE

(71) Applicant: Vijayakumar Rudrappa Dhuler, Bengaluru (IN)

(72) Inventor: Vijayakumar Rudrappa Dhuler, Bengaluru (IN)

( * ) Notice: Subject to any disclaimer, the term of this patent is extended or adjusted under 35 U.S.C. 154(b) by 0 days.

(21) Appl. No.: 15/527,305

(22) PCT Filed: Nov. 19, 2015

(86) PCT No.: PCT/IN2015/000429
§ 371 (c)(1),
(2) Date: May 16, 2017

(87) PCT Pub. No.: WO2016/079756
PCT Pub. Date: May 26, 2016

(65) Prior Publication Data
US 2019/0122518 A1    Apr. 25, 2019

(51) Int. Cl.
*G08B 21/02* (2006.01)
*G10L 25/51* (2013.01)
*G06F 21/64* (2013.01)
*H04B 1/3827* (2015.01)

(52) U.S. Cl.
CPC ......... *G08B 21/0208* (2013.01); *G06F 21/64* (2013.01); *G08B 21/0202* (2013.01); *G08B 21/0277* (2013.01); *G10L 25/51* (2013.01); *H04B 1/385* (2013.01)

(58) Field of Classification Search
CPC .. G08B 21/0208; G08B 21/0277; G10L 25/51
USPC .................................................... 340/539.15
See application file for complete search history.

(56) References Cited

U.S. PATENT DOCUMENTS

| | | | | |
|---|---|---|---|---|
| 5,389,917 A * | 2/1995 | LaManna | ........... | G06K 7/10881 235/462.27 |
| 6,937,135 B2 * | 8/2005 | Kitson | .................... | G06F 21/32 340/5.4 |
| 8,107,920 B2 * | 1/2012 | Ben Ayed | ........... | A61B 5/7415 455/404.1 |
| 2010/0311387 A1 * | 12/2010 | Cameron | ............. | G08B 25/016 455/404.2 |
| 2015/0370527 A1 * | 12/2015 | Goldstein | ........... | H04R 1/1091 700/94 |

* cited by examiner

*Primary Examiner* — John A Tweel, Jr.
(74) *Attorney, Agent, or Firm* — The Law Office of Austin Bonderer, PC; Austin Bonderer (57) ABSTRACT

A personal safety device is provided. The device is a wearable device. The device includes a voice recording mechanism and an information download mechanism. The device may also include a voice comparison mechanism, an alert mechanism, a photodetector, a camera and/or a scanner. Method of enabling and using the device is also provided. The device may be used as a personal safety device and as a personnel monitoring device.

11 Claims, 9 Drawing Sheets

PERSONAL SAFETY DEVICE

CROSS-REFERENCE TO PRIOR FILED PATENT APPLICATIONS

This application claims priority from PCT Patent Application number PCT/IN2015/000429 filed on Nov. 19, 2015 the complete disclosure of which, in its entirely, is herein incorporated by reference.

FIELD OF INVENTION

The present disclosure is directed to a personal safety device. More particularly the present disclosure is directed to a wearable personal safety device.

BACKGROUND OF INVENTION

Every other day we read news reports of yet another case of a physical abuse. From the number of increasing reports, this act/behavior by certain people appears to be spreading like a contagious disease. As in case of any disease, prevention is always better than a cure. Though we have laws for protection against abuse, these laws do not appear to deter the abusers. The authorities and we need to be doing more to protect our society, particularly women and children, from having to suffer such unpleasant situations. Especially since any such experience leaves an indelible mark on the victim and the negative effects of such abuse is well-known.

Data theft, corruption, unscrupulous dealings, etc. are also some burning issues in the society. Though we have laws against corruption, cheating, malpractice, etc. these laws do not appear to deter a wrongdoer.

Therefore there is a need to protect our society from having to undergo such abuse and such unscrupulous activities. More particularly there is a need for a device that can serve as an information recorder to prevent such instances from happening or minimize such instances from recurring.

SUMMARY OF INVENTION

In one embodiment, there is provided a personal safety device. The device is wearable. The device includes a voice recording mechanism, a voice comparison mechanism, and an information download mechanism.

In another embodiment, there is provided a personal safety/monitoring device. The device is a wearable device. The device includes a voice recording mechanism, a voice comparison mechanism, and an information download mechanism. The device may include a photodetector. The device may also include an alert mechanism. The device may include a camera/scanner.

In yet another embodiment, there is provided a personal safety/monitoring device. The device is a wearable device. The device includes a voice recording mechanism, and an information download mechanism. The device may include a photodetector. The device may also include an alert mechanism. The device may include a camera/scanner.

In still yet another embodiment, is provided a method for recording the activities of a user using a personal safety/monitoring device. The method includes a first step of providing a device. The device is a wearable device. The device includes a voice recording mechanism, a voice comparison mechanism, and an information download mechanism. In a second step the method includes recording the voice of the user in the device using the voice recording mechanism. The recorded voice functions as a signature of the user. In a third step the method includes ensuring that the device is in close proximity to the user. In a fourth step the method includes enabling the voice recording mechanism of the device to record all events occurring in a day of the user. In a fifth step the method includes enabling an authorized person to download the recorded information.

In still yet another embodiment, is provided a method for recording the activities of a user using a personal safety/monitoring device. The method includes a first step of providing a device. The device is a wearable device. The device includes a voice recording mechanism, a voice comparison mechanism, and an information download mechanism. The device may include a photodetector. The device may also include an alert mechanism. The device may include a camera/scanner. In a second step the method includes recording the voice of the user in the device using the voice recording mechanism. The recorded voice functions as a signature of the user. In a third step the method includes ensuring that the device is in close proximity to the user. In a fourth step the method includes enabling the voice recording mechanism of the device to record all events occurring in a day of the user. In a fifth step the method includes enabling an authorized person to download the recorded information identified with the particular voice and the particular conversation.

In still yet another embodiment, is provided a method for recording the activities of a user using a personal safety/monitoring device. The method includes a first step of providing a device. The device is a wearable device. The device includes a voice recording mechanism, a voice comparison mechanism, and an information download mechanism. The device may include a photodetector. The device may also include an alert mechanism. The device may include a camera/scanner. In a second step the method includes recording the voice of the user in the device using the voice recording mechanism. The recorded voice functions as a signature of the user. In a third step the method includes ensuring that the device is in close proximity to the user. In a fourth step the method includes enabling the voice recording mechanism of the device to record all events occurring in a day of the user. In a fifth step the method includes enabling the device to recognize a particular voice and a particular conversation. In a sixth step the method includes enabling an authorized person to download the recorded information identified with the particular voice and the particular conversation and visual images of the surrounding recorded by the camera/scanner.

By using the above device it may be possible to protect a user from undergoing abuse and deter abusers and potential abusers from continuing their antisocial activities.

DETAILED DESCRIPTION

Embodiments of the disclosure as disclosed herein provide a personal safety device. More particularly the disclosure provides a wearable personal safety device.

Figure 1A:
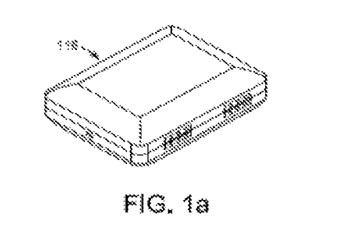
FIG. 1A and FIG. 1B provide a schematic representation of a personal safety device in accordance with the embodiments of the present invention.
Figure 1B:
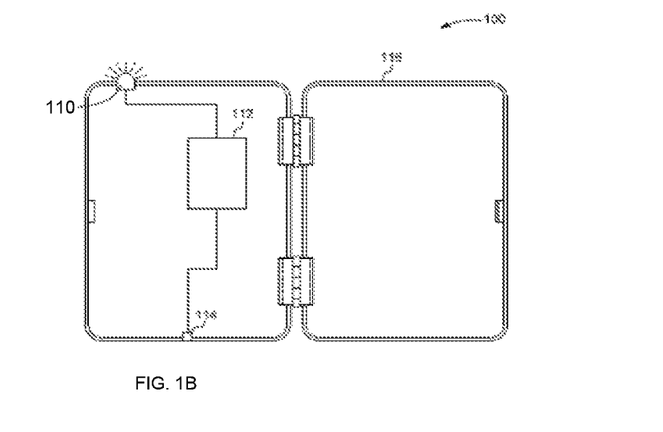

Accordingly, in one embodiment, with reference to FIG. 1A and FIG. 1B are provided a personal safety device 100. The device 100 is a wearable device. The device includes a voice recording mechanism 110, a voice comparison mechanism 112, and an information download mechanism 114. In one embodiment, the personal safety device may encase the voice recording mechanism 110, the voice comparison mechanism 112, and the information download mechanism 114 in an enclosure 116. The enclosure 116 may be designed in any manner such that the personal safety device is wearable i.e., for example in a rectangular box 116 design as shown in FIG. 1a.

Figure 2:
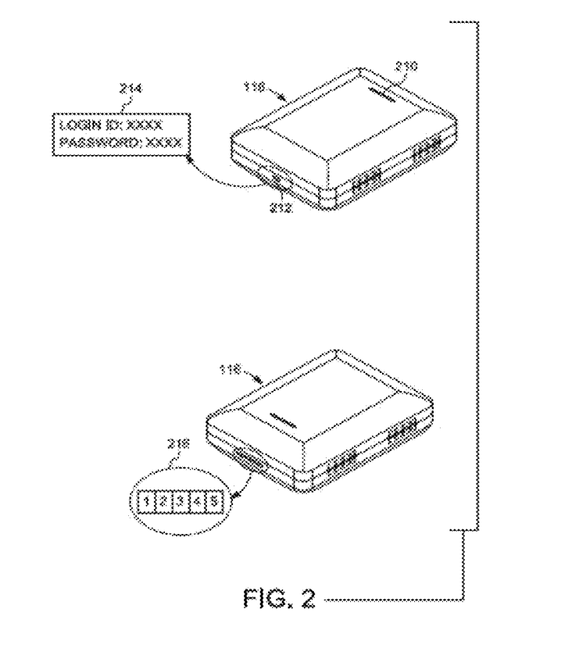
FIG. 2 provides a schematic representation of a personal safety device in accordance with the embodiments of the present invention.

Referring to FIG. 2, the personal safety device 200 may include a first port 210 to ensure that the voice recording mechanism 110 is not impaired in any manner by the enclosure 116. The personal safety device may include a second port 212 for access to the information download mechanism 114. In various embodiments, the information download mechanism may be rendered accessible only to an authorized person by using locking devices known to one skilled in the art. In one embodiment, the access to the information may be password protected 214. In another embodiment, the access to the information may be physically locked with a tumbler lock 216.

Figure 3:
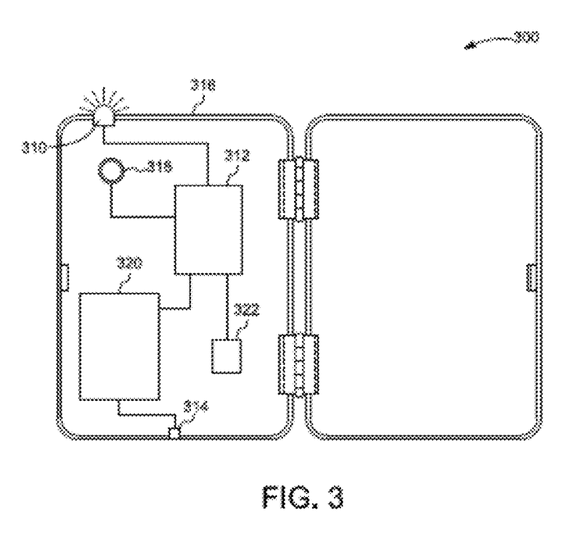
FIG. 3 provides a schematic representation showing the method of use of a personal safety device in accordance with the embodiments of the present invention.

In one embodiment, referring to FIG. 3 is provided a personal safety device 300. The device 300 is a wearable device. The device includes a voice recording mechanism 310, a voice comparison mechanism 312, an information download mechanism 314, an alert mechanism 320, a photodetector 322, and a camera 318. In certain embodiments, the personal safety device 300 may include a scanner (not shown in figure) in addition to or in replacement of the camera 318. In one embodiment, the personal safety device may encase the voice recording mechanism 310, the voice comparison mechanism 312, the information download mechanism 314, the alert mechanism 320, the photodetector 322, and the camera 318 in an enclosure 116. The enclosure may be designed in any manner such that the personal safety device 300 is wearable.

In one embodiment, the voice recording mechanism 110 may record the events of the entire day of the user, In another embodiment, the voice recording mechanism may trigger a recording sequence only when the particular voice or the particular conversation is detected by the device.

In one embodiment, the voice recording mechanism 110 of the device is enabled to record a particular voice and a particular conversation. In various embodiments, the particular voice may include the voice of the user when the user is in fear, when the user is crying, when the user is screaming with fear, and the like. In many cases of abuse, where the user is a child, the abuser happens to be a person known to the child or who works in the places/institutions frequented by the child, like home, school, park, crèche, shop, market, etc. Accordingly, the particular voice, in certain embodiments may also include the voice of adults who may form the immediate ecosystem of the user. In various embodiments, the particular conversation may include catch phrases from a person other than the user. The catch phrases may include sweet talk, threatening to inform some matter to a teacher or a parent, and the like.

In one embodiment, the device is enabled to recognize the gender of the adult. In this embodiment, the device records conversations of an adult male. This may assist in reducing the amount of recording so as to reduce the time required for analysis of the recording. In one embodiment, the device may be enabled to recognize the user's voice, for example, the child's voice (using a signature voice already recorded in the device). The device may then be enabled to record a sample of a given duration of the conversation surrounding an instance when the user/child speaks with a voice recorded as the signature voice. In this embodiment, having to isolate the gender of the person other than the user who is in conversation with the user may be avoidable.

The voice comparison mechanism 112 may compare the voice signatures already stored in the device to recorded conversations. In instances where there is a match between the voice signature and the voice in the recorded conversations, that section of the recording is highlighted and option is provided to play back the conversation surrounding the identified conversation to varied lengths. For example, all instances of a child's conversation whose voice signature is stored in the device may be identified and played back. In one embodiment, where the voice recording mechanism 110 may record the events of the entire day of the user, the voice comparison mechanism 112 may be used to filter out the background noise and provide only conversations between the user and another person. In embodiments where the voice recording mechanism 110 may record the particular voice or the particular conversation the voice comparison mechanism 112 may be used to compare the voices/conversations stored in the device and filter out only the recognizable voices/conversations and provide only this information to the information download mechanism 114 when accessed by an authorized person. In certain embodiments, the voice comparison mechanism 112 may also function as a voice detector mechanism. The voice comparison mechanism 112 can then detect the particular voice or the particular conversation. In such embodiments, the voice recording mechanism 110 may start recording only if the voice detector mechanism provides a comparison for a particular voice or particular conversation and triggers the voice recording mechanism 110 to record the conversations. The voice comparison mechanism may be also be enabled to filter the voice of the particular voice or the particular conversation when an authorized person attempts to download the recorded information from the information download mechanism 114. The voice comparison mechanism may be referred to as a voice analysis mechanism as well as it carries out various analysis while providing a voice comparison.

In one embodiment, the device includes an alert mechanism 320. The alert mechanism may be enabled to sound an alert when certain events occur. The event may include situations where the voice comparison mechanism detects the particular voice or the particular conversation, or when the device is moved away from the proximity of the user, or when an attempt is being made to disable the device, etc. The alert may be designed to sound whenever the voice comparison mechanism acting as a voice detector mechanism triggers the voice recording mechanism, or after the recording is complete. In one embodiment, the alert/alarm may be sounded in by the device to alert others in the immediate vicinity. In another embodiment, the alert/alarm may be transmitted to the authorized person in a remote location. The alert/alarm may be in the form of a voice alert or a visual alert. The device may also include alert mechanisms to indicate that the device is functioning or if the device has stopped functioning.

Figure 4:
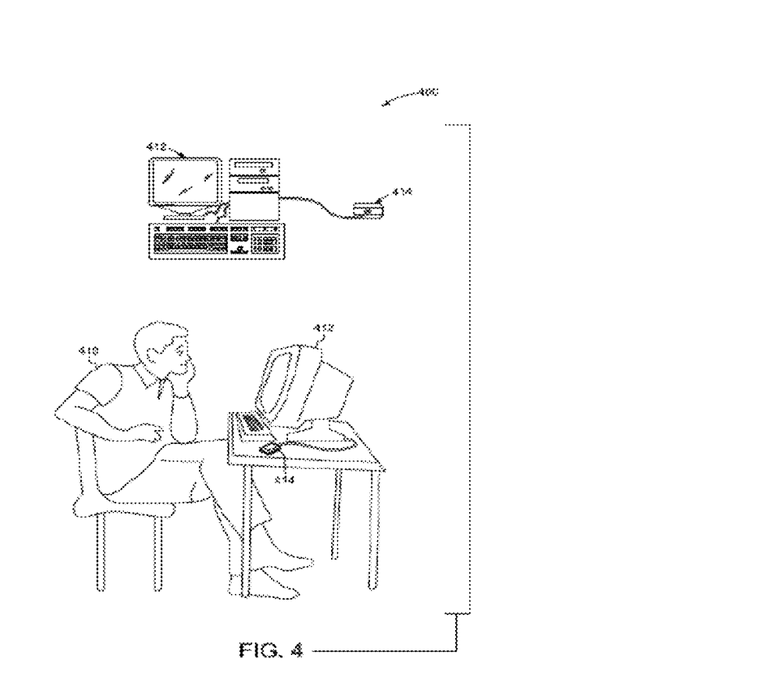
FIG. 4 provides a schematic representation showing the method of downloading information from a personal safety device in accordance with the embodiments of the present invention.
Figure 5:
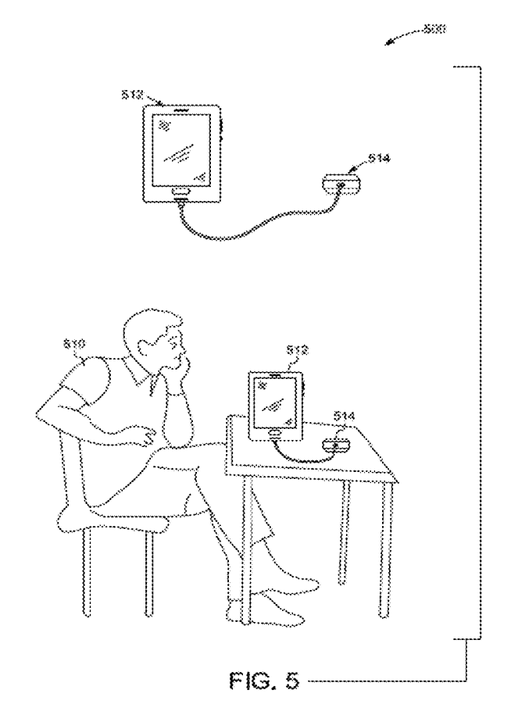
FIG. 5 provides a schematic representation showing the method of downloading information from a personal safety device in accordance with the embodiments of the present invention.

The device may also include an information download mechanism 114. The information download mechanism may allow an authorized person to access the information directly by connecting the device to a hearing device. The information download mechanism may include a USB, that allows the authorized person to download the information on a USB or like device, and check the information on their personal systems like computers, laptop, smartphone etc. . . . The information download mechanism may also include online transfer of data from the device to the personal systems of the authorized person. Referring to FIG. 4 and FIG. 5 a method of information download 400, 500 using the information download mechanism is provided in accordance with the present invention. FIG. 4 shows the information being downloaded from a personal safety device 414 into a personal computer 412. FIG. 4 also shows an authorized person 410 downloading information from a personal safety device 414 into a personal computer 412. The authorized person may then use the software available in the personal computer 412 to analyze the recorded information and take necessary actions as described herein. FIG. 5 shows the information being downloaded from a personal safety device 514 into a hand phone 512. FIG. 5 also shows an authorized person 510 downloading information from a personal safety device 514 into a hand phone 512. The authorized person may then use the software available in the hand phone 512 to analyze the recorded information and take necessary actions as described herein.

Accordingly, in one embodiment, the device only records the voice. An external system having a software for analyzing the different aspects disclosed herein i.e., recognizing the gender of the adult speaking to the user, recognizing the user, recognizing stressful events being experienced by the user etc. takes care of the analysis externally.

In certain embodiments, the device may include a photodetector 322. As mentioned herein the device may be placed on the user or in an item in close proximity to the user. Accordingly the device may be subjected to a particular quantum of light. The data on the quantum of light the device may be subjected to when placed in the manner as herein described may be prejudged and stored as comparative data in the device. For example, if the device is being worn as a pendant by a child inside a dress worn by the child, the quantum of light falling on the device may be prejudged. There could be various events where the quantum of light falling on the device may be in excess or may be less than the quantum of prejudged light. (i) If the device is subjected to excessive quantum of light by removing the dress or by removing the device and throwing it aside; or (ii) if the device is subjected to reduced quantum of light by holding in the hand so as to suppress recording. In both these sample embodiments the quantum of light when compared to the prejudged quantum of light falling on the devices when different the device is capable of setting of an alert/alarm. The alarm/alert can alert someone in the vicinity or the authorized person who can then take the necessary preventive/corrective action.

In one embodiment the device may include a camera 318 or a scanner. In a normal condition when the device does not detect any potential threat to the user the camera/scanner may be in a switched-off mode. Once the device recognizes a particular voice or a particular conversation or the photodetector gives out an alarm as described herein the device may be enabled to switch-on the camera/scanner. The camera/scanner may be enabled to take photographs or scan the surrounding and record images of the happenings. The camera can be enabled to take still photographs, burst photographs, video recording, etc. The scanner may be used in a manner similar to the camera and may also be able to scan the finger print of the person violating the user.

In one embodiment, the authorized person may require an authentication to access the recorded information. The authentication may include voice authentication, finger print authentication, password authentication 214, and the like as shown with reference to FIG. 2. The authentication may also include physical authentication in the form of a physical combination lock 216. Thus, access to the recording is controlled by using the physical combination lock 216 which opens after entering a valid key.

Figure 6A:
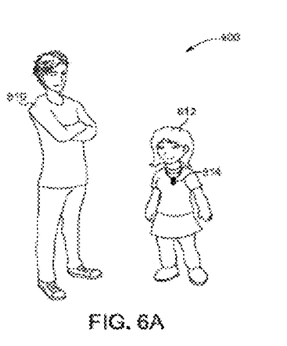
FIG. 6A and FIG. 6B provide a schematic representation showing the method of use of a personal safety device in accordance with the embodiments of the present invention.
Figure 6B:
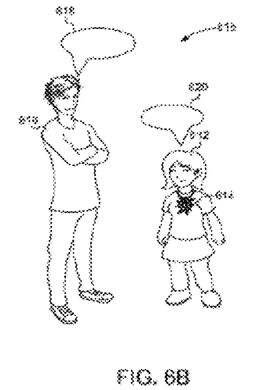
Figure 7:
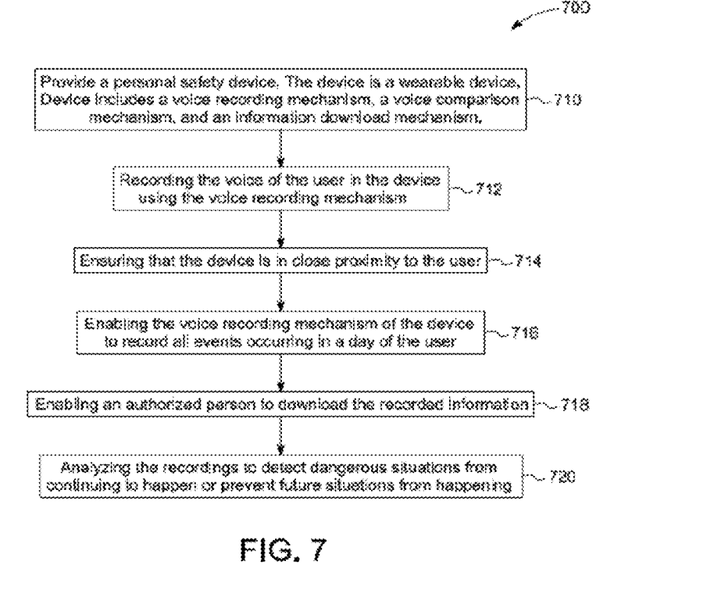
FIG. 7 provides a schematic representation showing the method of use of a personal safety device in accordance with the embodiments of the present invention.

Referring to FIGS. 6a, 6b, and 7, in another embodiment, is provided a method 600,700 for protecting a user using a personal safety device 614. The method includes a first step 710 of providing a device 614. The device 614 is a wearable device. The device includes a voice recording mechanism, a voice comparison mechanism, and an information download mechanism (not shown in figure) as discussed with reference to FIG. 1. In certain embodiments as discussed with reference to FIG. 3, the device 614 may also include a photodetector, an alert mechanism, and a camera/scanner. In a second step 712 the method includes recording the voice of the user in the device using the voice recording mechanism. The recorded voice functions as a signature of the user. In a third step 714 the method includes ensuring that the device 614 is in close proximity to the user in the form a pendant as shown in FIGS. 6a and 6b. In a fourth step 716 the method includes enabling the voice recording mechanism of the device to record all events occurring in a day of the user. Referring to FIG. 6a, when a person 610 is standing near a user 612 the device 614 does not appear to be active. When the person 610 starts having a conversation 618 with the user 612 as shown by 616 and the user also has a conversation 620 with the adult the device 614 starts recording the conversation. In a fifth step 718 the method includes enabling an authorized person to download the recorded information. In certain embodiments, a sixth step may be included. In a sixth step 720, the method may include a step of analyzing the recordings to detect dangerous situations from continuing to happen or prevent future situations from happening.

In yet another embodiment, is provided a method for protecting a user using a personal safety device. The method includes a first step of providing a device. The device is a wearable device. The device includes a voice recording mechanism, a voice comparison mechanism, an alert mechanism, and an information download mechanism. In a second step the method includes recording the voice of the user in the device using the voice recording mechanism. The recorded voice functions as a signature of the user. In a third step the method includes ensuring that the device is in close proximity to the user. In a fourth step the method includes enabling the voice recording mechanism of the device to record all events occurring in a day of the user. In a fifth step the method includes enabling an authorized person to download the recorded information. In a sixth step the method includes enabling the device to sound an alert when certain events occur.

Figure 8:
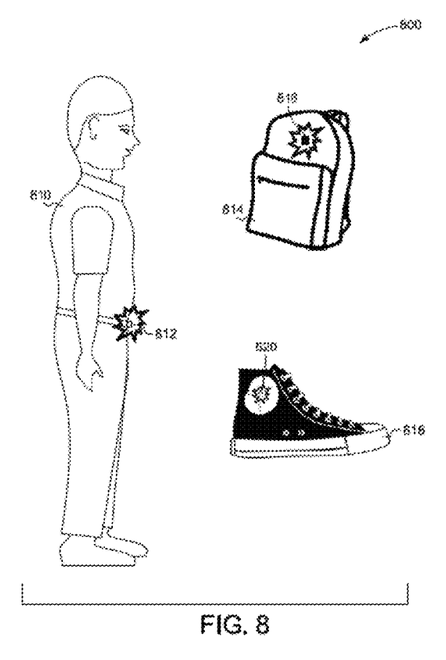
FIG. 8 provides a schematic representation showing the various ways in which the personal safety device may be placed in accordance with the embodiments of the present invention.

In one embodiment, it is to be ensured that the device is in close proximity to a user (third step 714 with reference to FIG. 7). In one embodiment, the device may be in direct contact of the user's self. Accordingly, the device may be shaped in the form of jewelry, like a locket, ear rings, belt buckle, etc. In another embodiment, the device may be placed in an item which is generally carried by the user in close proximity of the user's self. Accordingly the device may be placed in a bag, shoe, identity card, wallet, etc. Referring to FIG. 8, various ways in which the device may be placed in close proximity to the user are provided. In one embodiment the device may be shaped in the form a belt buckle 812 worn by the user 810. In one embodiment the device 816 may be may be placed in the bag 814 worn by the user 810. In one embodiment the device 820 may be placed in the shoe 818 worn by the user 810.

In one embodiment, the user may include a child. In another embodiment, the user may include a female child. In yet another embodiment, the user may include a male child. In certain embodiments, the user may include any person who is vulnerable and is incapable of protecting their self from an abuser. In certain embodiments the device may be used as a personnel/employee monitoring device.

The device described herein may be further used as a personnel monitoring device i.e., as an employee monitoring device. For example, persons employed in deal making like sales persons, marketing personnel, government personnel handling license/agreement transactions, etc.; school personnel including teachers, non-teaching personnel, etc. may also wear this device. In these cases, the device may be slightly modified. The device may include the recording mechanism that is used to record the day's events for a person using the device. It may include the downloading mechanism that will enable an authorized person to download and study the study the day's events. The device may include the photodetector for similar reasons as mentioned above i.e., if the device receives less or more light than prejudged and alarm will be sent and this can be checked by an authorized person. The device may also include the camera/scanner to capture visual images of the day's events based on information pre-fed to the device with references to earlier scenarios.

Figure 9:
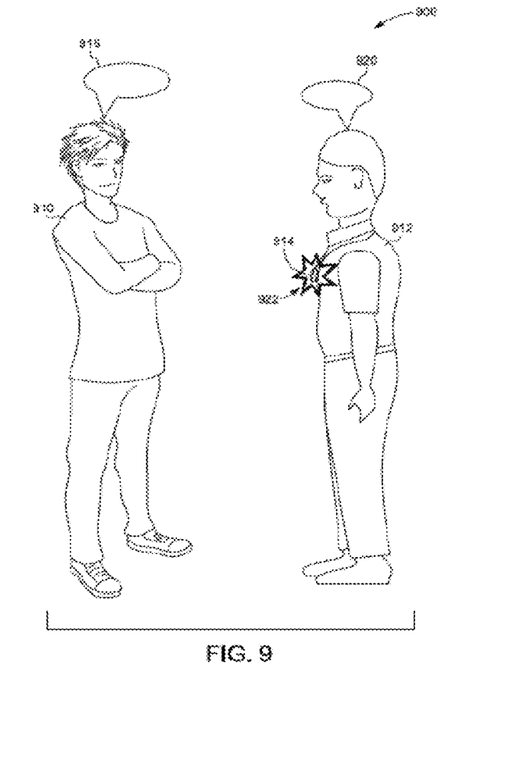
FIG. 9 provides a schematic representation showing the method of use of a personal safety device in accordance with the embodiments of the present invention.

Referring to FIG. 9, a method 900 is provided for using the device as a personnel monitoring device. When a person 910 is standing near a user 912 the device 914 may be active or may not be active when there is no conversation 918,920. When the person 910 starts having a conversation 918 with the user 912 and the user also has a conversation 920 with the adult as shown by 916 the device 914 starts recording 922 the conversation. The recorded information may then be downloaded by an authorized person as herein described. In various embodiments as described herein before the device 914 may record all the happenings in the day of a user, may record happenings when any person is having a conversation with the user, may record select happenings only when there is conversation between the user and a particular person, and the like.

In certain embodiments, the device may include a protective covering/coating that may render the device water proof, dust proof, shock proof, etc. . . . .

In various embodiments, the device may be programmed to identify and sort and/or exclude certain conversations. Accordingly, in one embodiment, the recorded conversation is used to identify the gender of the speaker and only conversations of a male speaker are sorted out to provide protections from the male predator. In another embodiment, the conversations of the child with other children is excluded to provide privacy to the child In one embodiment, group conversations (of more than two people) and class room teachings may be excluded to provide privacy.

In certain embodiments, the device may also provide tracking of a suspect by storing the voice as a signature and detecting their voice and conversations in future recordings.

Although the terms first, second, third, etc. . . . may be used herein to describe various steps that are followed to work/use the device the method however should not be limited by these terms. These terms may be only used to distinguish one step from another in the method being employed. Terms such as "first," "second," and other numerical terms when used herein do not imply a sequence or order unless clearly indicated by the context. Thus, a first step discussed above could be termed a second step without departing from the teachings of the example embodiments.

The foregoing embodiments meet the overall objectives of this disclosure as summarized above. However, it will be clearly understood by those skilled in the art that the foregoing description has been made in terms only of the most preferred specific embodiments. Therefore, many other changes and modifications clearly and easily can be made that are also useful improvements and definitely outside the existing art without departing from the scope of the present disclosure, indeed which remain within its very broad overall scope, and which disclosure is to be defined over the existing art by the appended claims.

What is claimed is:

1. A personal safety device, comprising:
   a voice recording mechanism that records the voice of the user, wherein the recorded voice functions as a signature of the user, wherein the voice recording mechanism ensures that the personal safety device is in close proximity to the user and records all events occurring in a day of the user;
   a voice comparison mechanism that compares the voice signatures already stored in the personal safety device with recorded conversations; and
   an information download mechanism that enables an authorized person to download the recorded information,
   wherein the personal safety device is wearable.

2. The personal safety device of claim 1, wherein the personal safety device comprises an alert mechanism that enables to sound an alert when certain event occurs, wherein the event includes at least one of (i) situations where the voice comparison mechanism detects the particular voice or the particular conversation, when the device is moved away from the proximity of the user or when an attempt is being made to disable the device.

3. The personal safety device of claim 1, wherein the personal safety device comprises a photo detector, wherein the photo detector provides an alarm to enable the personal safety device to switch-on a camera.

4. The personal safety device of claim 3, wherein the camera captures photographs or scans the surrounding and records images of the happenings once the personal safety device recognizes the particular voice and the conversation.

5. A method for protecting a user of a personal safety device comprising;
- a first step of providing the personal safety device, wherein the personal safety device comprises a voice recording mechanism, a voice comparison mechanism, and an information download mechanism;
- a second step of recording the voice of the user using the voice recording mechanism, wherein the recorded voice functions as a signature of the user;
- a third step of ensuring that the personal safety device is in close proximity to the user;
- a fourth step of ensuring that the voice recording mechanism records all events occurring in a day of the user; and
- a fifth step of enabling an authorized person to download the recorded information.

6. The method of claim 5, wherein the personal safety device is a wearable device.

7. The method of claim 5, wherein the personal safety device is capable of identifying a particular voice.

8. The method of claim 5, wherein the personal safety device is capable of identifying a particular conversation.

9. The method of claim 5, comprising a sixth step of analyzing the recordings to detect dangerous situations from continuing to happen or prevent future situations from happening.

10. A method for protecting a user of a personal safety device comprising;
- a first step of providing the personal safety device, wherein the personal safety device comprises a voice recording mechanism, a voice comparison mechanism, an alert mechanism, and an information download mechanism;
- a second step of recording the voice of the user using the voice recording mechanism, wherein the recorded voice functions as a signature of the user;
- a third step of ensuring that the personal safety device is in close proximity to the user;
- a fourth step of ensuring that the voice recording mechanism records all events occurring in a day of the user; and
- a fifth step of enabling an authorized person to download the recorded information identified with the particular voice or the particular conversation.

11. The method of claim 10, wherein the authorized person is enabled to download only the particular voice or the particular conversation from among all events occurring in the day of the user.

* * * * *